US012766542B2

(12) United States Patent
Ruwet et al.

(10) Patent No.: US 12,766,542 B2
(45) Date of Patent: Oct. 20, 2026

(54) PROCESS FOR MANUFACTURING A STEEL STRIP FOR ELECTRICAL APPLICATIONS AND ASSOCIATED APPARATUS

(71) Applicant: ArcelorMittal, Luxembourg (LU)

(72) Inventors: Vincent Ruwet, Vise (BE); Charles Hanquet, Liege (BE); Jacques Hernandez, St Martin de Crau (FR); Yves Charbonnel, Serverette (FR)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 18/697,578

(22) PCT Filed: Oct. 6, 2022

(86) PCT No.: PCT/IB2022/059551
§ 371 (c)(1),
(2) Date: Apr. 1, 2024

(87) PCT Pub. No.: WO2023/057948
PCT Pub. Date: Apr. 13, 2023

(65) Prior Publication Data

US 2024/0408637 A1 Dec. 12, 2024

(30) Foreign Application Priority Data

Oct. 7, 2021 (WO) .................. PCT/IB2021/059204

(51) Int. Cl.
*B05C 1/08* (2006.01)

(52) U.S. Cl.
CPC .......... *B05C 1/0834* (2013.01); *B05C 1/0808* (2013.01); *B05C 1/083* (2013.01)

(58) Field of Classification Search
None
See application file for complete search history.

(56) References Cited

U.S. PATENT DOCUMENTS 3,552,353 A * 1/1971 Labombarde ............ B05D 1/28 118/212
4,363,288 A * 12/1982 Fara ...................... B05C 1/0865 118/210

(Continued)

FOREIGN PATENT DOCUMENTS

DE 4328011 A1 3/1994
EP 3143179 B1 2/2019

(Continued)

OTHER PUBLICATIONS

International Search Report of PCT/IB2022/0059551 dated Dec. 23, 2022.

*Primary Examiner* — Jethro M. Pence
(74) *Attorney, Agent, or Firm* — Davidson Kappel LLC

(57) ABSTRACT

A coating apparatus for the continuous manufacturing of steel strips coated with a varnish for electrical applications including a tank, a coating roll and an applicator roll wherein: the tank is able to contain a varnish solution and is configured such that the coating roll dips into the varnish solution, the applicator roll 4 is configured to be in contact with the coating roll 3 and the steel strip S, is configured to homogeneously coat the steel strip in the width of the steel strip and the surface of the applicator roll has a shore A hardness from 40 to 60.

18 Claims, 2 Drawing Sheets

(56) References Cited

U.S. PATENT DOCUMENTS 4,509,454 A * 4/1985 Vertegaal ............ B41F 15/0809 101/119
4,741,929 A * 5/1988 Kossuth ................... B05D 1/28 118/223
5,631,048 A * 5/1997 Kinose ..................... B05D 1/28 118/244
6,277,196 B1 8/2001 Woodman et al.
6,673,391 B1 * 1/2004 Perkett .................. B05C 1/0808 427/211
7,323,056 B2 * 1/2008 Horie ...................... B05C 1/086 118/227
7,625,605 B2 * 12/2009 Cooprider ............... B05C 1/165 427/288
7,976,656 B2 * 7/2011 Sartoni ................. B05C 1/0808 427/427.2
10,337,106 B2 * 7/2019 Stouff ...................... B05D 1/28
11,214,873 B2 * 1/2022 Stouff ..................... C23C 22/00
12,358,013 B2 * 7/2025 Bolza-Schünemann ..................... H01M 4/0435
2010/0009088 A1 1/2010 Eriksson et al.
2010/0224286 A1 * 9/2010 Bertkau .................. C23C 22/20 148/253
2016/0030968 A1 2/2016 Kobayashi et al.
2017/0107626 A1 4/2017 Stouff et al.
2025/0108593 A1 * 4/2025 Bauer ................... B05C 1/0865

FOREIGN PATENT DOCUMENTS

JP H04271871 A 9/1992
JP H10309512 A 11/1998
JP 2001029874 A 2/2001
JP 2001505127 A 4/2001
JP 2005195988 A 7/2005
JP 2009233499 A 10/2009

* cited by examiner

PROCESS FOR MANUFACTURING A STEEL STRIP FOR ELECTRICAL APPLICATIONS AND ASSOCIATED APPARATUS

The invention relates to an apparatus and a method for the continuous manufacturing of steel strips coated with a homogenous varnish layer for electrical applications.

BACKGROUND

The terminology "electrical applications" relates to the use of steel strips to manufacture goods having specific magnetic properties, e.g. stator and rotor of electric motors, transformers and turbines of windmills. Steel for electrical applications are also known as electrical steel and generally comprises 0 to 6 weight percent of silicon. The electrical steels can be divided into two categories: the non-oriented steel and the oriented steel.

The electrical steels are usually coated with a varnish to insulate the steel in order to prevent the flow of electricity and to reduce the eddy current. This varnish is generally a water-based solution comprising 25 to 75 weight percent of resin and 5 to 15 weight percent of solvent (such as alcohol) and a balance consisting of water. The varnishing process comprises at least two steps: a first one where the varnish is coated in the form of a wet film and a second one where the varnish is cured to get a reticulated dry film. The thickness of the wet film is generally from 1.5 to 15 μm in order to have a dry film thickness from 0.8 to 5 μm.

In the manufacturing process, the varnishing takes place after an annealing. Depending on the line architecture, the varnishing section can be coupled with the annealing furnace or not. The fact that the varnish section is coupled or not with an annealing furnace impacts the line speed. Furthermore, the varnish needs to be reticulated in a drying step at the peak metal temperature (PMT) which also limits the maximal speed line. Consequently, the line speed can vary from 30 to 300 $m \cdot min^{-1}$.

U.S. Pat. No. 6,277,196 aims at coating a thin uniform layer of an insulating lacquer consistently at high speeds on an electrical steel strip. This apparatus comprises an engraved pick-up roll and an applicator roll having a substantially plain surface free of grooves or other indentations.

EP 3 143 179 discloses a process and an equipment to uniformly coat a packaging steel with a passivation layer. This apparatus comprises a chamber doctor blade, a coating roll and an applicator roll.

SUMMARY OF THE INVENTION

A purpose of this invention is to provide an apparatus and a method permitting to uniformly varnish an electrical steel strip for a wide range of line speeds. Consequently, the varnish layer on the steel should not present any pattern. Indeed, most of the coating apparatus for electrical steel are coupled with an annealing furnace leading to variation of the line speed.

The present invention provides a coating apparatus 1 for the continuous manufacturing of steel strips S coated with a varnish for electrical applications comprising a tank 2, a coating roll 3 and an applicator roll 4 wherein:

- said tank 2 is able to contain a varnish solution and is configured such that said coating roll 3 is in contact with said varnish solution,
- said coating roll 3 is configured to be in contact with said applicator roll 4 and to homogenously transfer, in the steel strip width direction, said varnish onto said applicator roll 4,
- said applicator roll 4 is configured to be in contact with said steel strip S, and to homogeneously coat said steel strip in the width of said steel strip and the surface of said applicator roll has a hardness from 40 to 60 shores A.

The present invention also provides a method for the continuous manufacturing of steel strip coated with a varnish, carried out by an apparatus as described above,

- wherein a varnish layer is deposited on at least one of the faces of said strip, said varnish layer having a wet thickness from 1.5 μm to 15 μm and said varnish having a viscosity from $2.5 \times 10^{-2}$ Pa·s at 20° C. to $4.0 \times 10^{-1}$ Pa·s at 20° C., and
- wherein said coating roll is supplied with varnish by being in contact with a varnish contained in said tank and said applicator roll being in contact with said coating roll and said steel strip and said steel strip running at a speed of at least 30 $m \cdot min^{-1}$.

BRIEF DESCRIPTION OF THE DRAWINGS

Other characteristics and advantages will become apparent from the following description of the invention.

DETAILED DESCRIPTION

Figure 1:
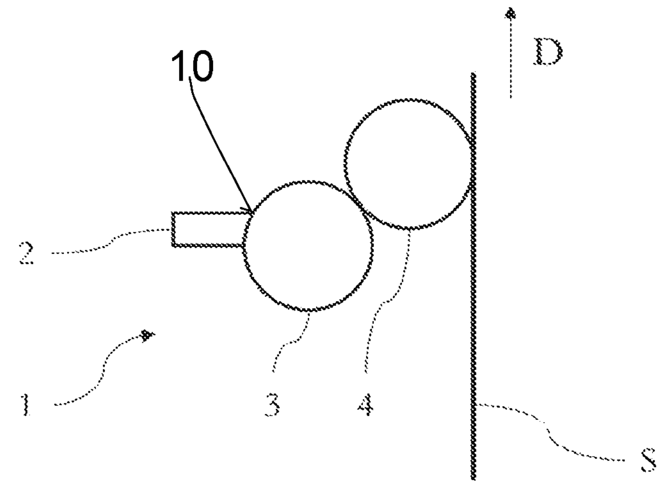
FIG. 1 illustrates an embodiment of the invention.

The invention, as represented in FIG. 1, relates to a coating apparatus 1 for the continuous manufacturing of steel strips S coated with a varnish for electrical applications comprising a tank 2, a coating roll 3 and an applicator roll 4 wherein:

- said tank 2 is able to contain a varnish solution and is configured such that said coating roll 3 is in contact with said varnish solution,
- said coating roll 3 is configured to be in contact with said applicator roll 4 and to homogenously transfer, in the steel strip width direction, said varnish onto said applicator roll 4,
- said applicator roll 4 is configured to be in contact with said steel strip S, and to homogeneously coat said steel strip in the width of said steel strip and the surface of said applicator roll has a shore A hardness from 40 to 60.

Figure 2:
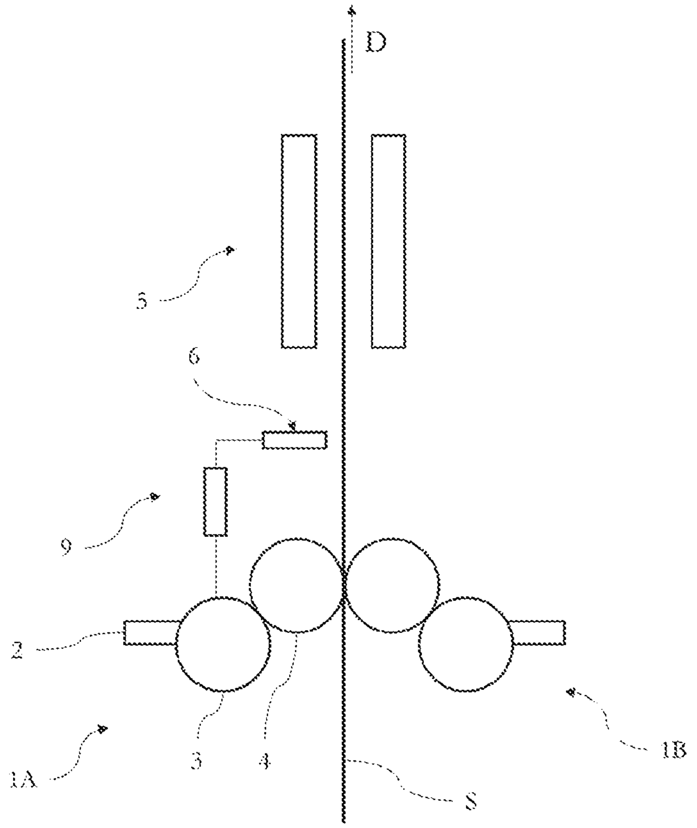
FIG. 2 illustrates a second embodiment of the invention.

FIG. 2 shows a steel strip S advancing through a varnishing installation, along a direction D. The strip first runs through the coating apparatus 1, the purpose of which is to apply a varnish solution, then through a drying unit 5, the purpose of which is to eliminate the moisture of the varnish and then reticulate the varnish. A device 6 that measures the thickness of the coated varnish can be located between the coating apparatus 1 and the drying unit 5 and can be connected to a control unit 9 of the coating apparatus 1.

In the embodiment illustrated in FIG. 2, the coating apparatus 1 is capable of coating the two faces of the strip simultaneously, but in an alternative embodiment the coating apparatus 1 can be made up only of the left part 1A or of the right part 1B of the apparatus so that it only coats a single face of the strip.

One embodiment of the left part 1A of the coating apparatus 1 is illustrated in FIG. 1. The right part 1B is not described because it is symmetrical to the left part 1A with reference to the strip S.

As illustrated in FIG. 1, this device is made up of a first roll 4, which is the applicator roll 4. This applicator roll 4 is in contact on one hand with the strip S and on the other hand with a second roll 3, which is the coating roll 3. During the manufacturing process, the coating roll 3 is in rotation and is in contact with the varnish solution, contained in the tank 2, to be deposited on the strip S. The contact between the coating roll and the varnish solution can be realized by dipping said coating roll into said varnish solution. The tank 2 is preferably equipped with a wiping device 10 (shown solely schematically as a doctor blade) that squeezes the solution on the surface of the coating roll 3.

The wiping device makes it possible to ensure that the coating roll 3 is coated with the necessary quantity of solution to be deposited to obtain the required wet varnish thickness. This wiping device is preferably equipped with doctor blade. This device can be made up of two blades, for example, the first blade being located at the point where the coating roll 3 enters the tank 2 and makes it possible to remove residual varnish solution remaining from the preceding passage of the coating roll 3 through the tank 2, and the second blade being located at the point where the roll coating roll 3 exits the tank 2, and makes it possible to remove the excess solution. The blades can be made, for example of plastic, stainless steel or carbon fibre. The device can also be a single blade, for example, a blade made of stainless steel, located at the point where the coating roll 3 exits the tank 2.

As illustrated in FIG. 1, the tank is preferably a chamber doctor blade. A chamber doctor blade system uses two doctor blades along with an enclosed varnish chamber to dispense the varnish to the coating roll. Usually, a first blade acts as the metering blade and wipes excess varnish from the coating roll, and a second blade acts as a capture or containment blade and holds the varnish within the chamber.

This varnish solution has a viscosity from $2.5\times10^{-2}$ Pa·s at 20° C. to $4.0\times10^{-1}$ Pa·s at 20° C. In a first example, the solution comprises dry extract between 30-50 weight percent composed of acrylic resin and phosphate pigments, co-solvent (alcohol) 5-10 weight percent and a balance consisting of water. In another example, the solution comprises dry extract of 40-60 weight percent being a mix of polyurethane resin and aluminium and silicon oxide, co-solvent (alcohol) 5-10 weight percent and a balance consisting of water.

The coating roll 3 is a roll coated by a ceramic whose surface is engraved. More precisely, the coating roll 3 is engraved with any patterns or cell structures. For example, the pattern can be a 60° or 30° or 70° hexagonal cells, line pattern, cobra pattern. The cells of the coating roll are filled with varnish solution. The surface of the coating roll can be made of ceramic. The cells of the coating roll can be etched with the aid of a laser or mechanical tooling.

Even though the coating roll is engraved with a pattern, the coating roll is configured to homogeneously transfer the varnish onto the applicator roll. It means that no pattern is transferred to the applicator roll. Consequently, the varnish thickness is homogeneous in the width direction.

In a first preferred embodiment, the coating roll 3 has a plurality of 60° hexagonally shaped cells, the line count of which is between 50 and 200 lines per centimetre, and the volume of which is from $5\times10^{-6}$ to $6\times10^{-5}$ $m^3$ per square meter of roll surface, and preferably from $1\times10^{-6}$ to $5\times10^{-5}$ $m^3$ per square meter of roll surface.

In second preferred embodiment, the coating roll 3 has a cobra pattern with a cell volume from $1\times10^{-5}$ to $8\times10^{-5}$ $m^3$ per $m^2$ of roll surface.

In a third preferred embodiment, the coating roll 3 has a quadrangular pattern with a cell volume from $1\times10^{-5}$ to $4\times10^{-5}$ $m^3$ per $m^2$ of roll surface.

After passage through the tank 2, the surface of the coating roll 3 coated with varnish solution comes into contact with the applicator roll 4. The coating roll 3 can rotate either in the clockwise direction or in the opposite direction. The applicator roll 4 is preferably itself driven in a direction of rotation that is opposite to the one of the coating roll 3.

The applicator roll 4, or at least its surface, is preferably made of a material that makes possible an optimum transfer of the solution, i.e. a transfer that minimizes the losses of solution due, for example, to absorption by the material of which the roll or its surface is made, or on the contrary by excessive slippage of the solution over the surface of the roll. This material can also exhibit resistance to chemical corrosion resistance as well as to mechanical wear. Preferably, the applicator roll 3 is made of elastomer. In a first preferred example, the applicator roll is made of chlorosulfonated polyethylene. In a second preferred embodiment, the applicator roll is made of polyurethane.

The applicator roll is configured to homogeneously coat said steel strip in the width direction. Consequently, there is no varnish pattern on the resulting coated strip. In order to achieve such a homogeneous coating, the applicator roll surface is a substantially plain surface free of grooves or other indentations.

Preferably, the applicator roll 3 has a roughness Ra from 0.5 μm to 3.5 μm. If the applicator roll roughness Ra is greater than 3.5 μm, inhomogeneity of the coated varnish can appear. Even more preferably, said applicator roll has a roughness Ra from 0.6 to 1.5 μm.

The applicator roll has a shore A hardness from 40 to 60. The hardness can be measured following the ASTM D2240 standard.

If the shore A hardness is below 40, then the lifespan of the applicator roll is severely reduced due to the coating process. Preferably, the applicator roll 3 has a shore A hardness of at least 45, such a minimal hardness provides a better lifespan and still provide a good deformation of the roll leading to an uniform coating.

If the shore A hardness is greater than 60, the maximum varnish wet thickness is too limited, especially for smaller line speed. Preferably, the applicator roll 3 has a shore A hardness of at most 55.

Figure 3:
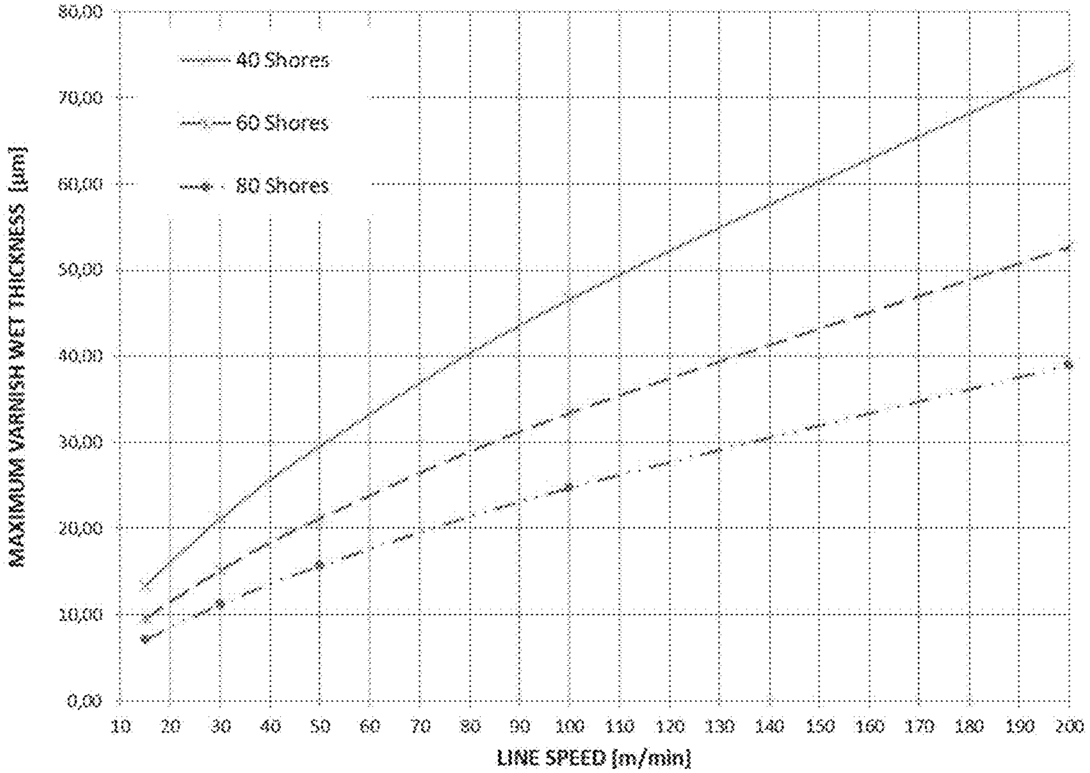
FIG. 3 illustrates the influence of the hardness of the applicator roll and the speed line on the maximum varnish thickness.

Indeed, in FIG. 3, the maximum varnish wet thickness that can be coated with a coating roll is plotted in function of the speed line. This is plotted for several hardness of the roll surface: 40 and 60 Shore A (as per the invention) and 80 shore A. All of the curves are plotted for a total force applied to the applicator roll of 3000 N per meter of width of the strip and a viscosity of 0.12 Pa·s. at 20° C.

It can be observed that for a coating roll according to the invention, the maximum wet thickness that can be coated is of at least 15 m for a speed line of at least 30 $m\cdot min^{-1}$.

Consequently, the claimed range of hardness for the applicator roll offers a wide range of varnish coating wet thickness while assuring a sufficient durability.

The invention also relates to a method for the continuous manufacturing of steel strips coated with a varnish, carried out by means of an apparatus as previously described, wherein a varnish layer is deposited on at least one of the faces of said strip, said varnish layer having a wet thickness from 1.5 μm to 15 μm and said varnish having a viscosity from $2.5\times10^{-2}$ Pa·s at 20° C. to $4.0\times10^{-1}$ Pa·s at 20° C., and wherein said coating roll is supplied with varnish by being in contact with a varnish contained in said tank and said applicator roll being in contact with said coating roll and said steel strip and said steel strip running at a speed of at least 30 $m \cdot min^{-1}$.

Preferably, said steel strip is an electrical steel strip. Even more preferably, said steel strip is a non-oriented electrical steel strip. Said non-oriented electrical steel strip preferably comprises from 1.5 to 4 weight percent of silicon.

Preferably, the steel strip is running at a speed from 30 to 500 $m \cdot min^{-1}$. Even more preferably, the steel strip is running at a speed from 30 to 300 $m \cdot min^{-1}$.

The contact pressure between the coating roll 3 and the applicator roll 4 must be sufficient to transfer the varnish solution from the coating roll to the applicator roll, although it must not be so great that it causes splashing which can result in losses of solution and therefore a non-optimal transfer of the solution. This pressure between said two rolls can be applied, for example, with the aid of a cylinder mounted on the coating roll 3. The total force $F_{RR}$ applied to the coating roll 3 is preferably from 500 to 3000 N per meter of width of the strip.

Following this contact, the applicator roll 4 is coated with the wet varnish solution which is to be deposited on the strip S.

The contact pressure between the applicator roll 4 and the strip must not be too great, at the risk of wiping off too much of the wet varnish solution film deposited, nor too low, at the risk of insufficiently wetting the strip with the solution. Moreover, a minimum pressure must be exerted by the roll on the strip to compensate for potential flatness defects in the latter. This pressure between the applicator roll 4 and the strip S can be applied, for example, with the aid of at least one cylinder mounted on the applicator roll. The total force $F_{TB}$ applied to the applicator roll 4 is preferably from 2000 to 6000 N per meter of width of the strip.

The speed of rotation of the applicator roll 4 and of the coating roll 3 can be synchronized with the speed of displacement of the strip.

In one embodiment of the invention, the thickness of the wet varnish thickness deposited is measured with the aid of the thickness-measuring device 6.

In addition, or in an additional embodiment of the invention, the speed of rotation of the coating roll 3 can be controlled by the control unit 9 illustrated in FIG. 1. This control unit 9 is connected to the device that measures the wet varnish thickness. If the thickness is less than a target thickness, the speed of the coating roll 3 is increased and vice-versa.

The thickness can be measured, for example, with the aid of an electromagnetic radiation gauge. These gauges are preferably installed as close as possible to the coating apparatus 1 because the moisture evaporates from the film very quickly, which can cause a significant variation in the measurements.

Following the step of the deposition of the wet varnish layer, the strip is subjected to a drying step. This drying step is carried out with the aid of a drying unit 5.

Preferably, following this drying phase, the thickness of the varnish layer deposited is from 0.8 μm to 5 μm after drying.

This drying unit 5 is, for example, a drying tunnel equipped with nozzles that spray air in the direction of the coated strip at a temperature between 12° and 350° C. The drying unit can also be an inductor increasing the temperature of the strip to a PMT preferably between 220° C. and 290° C.

What is claimed is:

1. A coating apparatus for continuously manufacturing a steel strip coated with a varnish for electrical applications comprising:

a tank;

a coating roll; and an applicator roll;

the tank capable of containing a varnish solution and configured such that the coating roll is in contact with the varnish solution, wherein the tank is a chamber doctor blade;

the coating roll configured to be in contact with said applicator roll and to homogenously transfer, in a steel strip width direction, the varnish onto the applicator roll;

the applicator roll configured to be in contact with the steel strip, and to homogeneously coat the steel strip widthwise, a surface of the applicator roll having a shore A hardness from 40 to 60.

2. The apparatus as recited in claim 1 wherein the surface of the applicator roll has a shore A hardness from 40 to 55.

3. The apparatus as recited in claim 1 wherein the surface of the applicator roll is made of an elastomer.

4. The apparatus as recited in claim 3 wherein the surface of the applicator roll is made of polyurethane.

5. The apparatus as recited in claim 1 wherein said tank is equipped with a wiping device.

6. The apparatus as recited in claim 1 wherein the surface of the applicator roll has a roughness Ra from 0.5 μm to 3.5 μm.

7. The apparatus as recited in claim 6 wherein the surface of the applicator roll has a roughness Ra from 0.6 μm to 1.5 μm.

8. The apparatus as recited in claim 1 wherein the surface of the applicator roll is substantially plain and free of grooves or indentations.

9. The apparatus as recited in claim 1 wherein the applicator roll is made of chlorosulfonated polyethylene.

10. The apparatus as recited in claim 1 wherein the applicator roll is made of polyurethane.

11. A method for continuously manufacturing a steel strip coated with a varnish, carried out via the apparatus as recited in claim 1, the method comprising the steps of:

depositing a varnish layer on at least one face of the strip, the varnish layer having a wet thickness from 1.5 μm to 15 μm and the varnish having a viscosity from $2.5 \times 10^{-2}$ Pa·s at 20° C. to $4.0 \times 10^{-1}$ Pa·s at 20° C., and supplying the coating roll with the varnish by being in contact with the varnish contained in said tank and the applicator roll being in contact with the coating roll and the steel strip and the steel strip running at a speed of at least 30 $m \cdot min^{-1}$.

12. The method as recited in claim 11 wherein the steel strip is an electrical steel.

13. The method as recited in claim 12 wherein the steel strip is a non-oriented electrical steel.

14. The method as recited in claim 11 wherein the varnish is a water-based varnish.

15. The method as recited in claim 11 wherein a total force exerted on said coating roll to contact the applicator roll is from 500 to 3000 N per meter of width of the coated steel strip.

16. The method as recited in claim 11 wherein a total force exerted on said applicator roll to contact the steel strip is from 2000 to 6000 N per meter of width of coated steel strip.

17. The method as recited in claim 11 further comprising, after the deposition of the varnish, subjecting the steel strip to a drying step.

18. The method as recited in claim 11 wherein a thickness of the varnish layer is from 0.8 μm to 5 μm after drying.

* * * * *